(12) United States Patent
Ishikawa et al.

(10) Patent No.: US 7,967,572 B2
(45) Date of Patent: Jun. 28, 2011

(54) HYDROGEN OPERATED POWER SYSTEM

(75) Inventors: Tetsuhiro Ishikawa, Nishikamo-gun (JP); Hitoshi Sato, Kagamihara (JP); Takashi Hyogo, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 746 days.

(21) Appl. No.: 10/531,207

(22) PCT Filed: Oct. 30, 2003

(86) PCT No.: PCT/IB03/04799
§ 371 (c)(1),
(2), (4) Date: Feb. 24, 2006

(87) PCT Pub. No.: WO2004/040684
PCT Pub. Date: May 13, 2004

(65) Prior Publication Data
US 2006/0153687 A1 Jul. 13, 2006

(30) Foreign Application Priority Data
Nov. 1, 2002 (JP) ................................. 2002-319647

(51) Int. Cl.
*F04B 49/00* (2006.01)
(52) U.S. Cl. ............. 417/18; 417/41; 417/19; 417/44.2; 417/44.11
(58) Field of Classification Search .................. 417/1, 9, 417/14, 18, 19, 33, 44.2, 44.3; 429/12, 13, 429/24, 25
See application file for complete search history.

(56) References Cited

U.S. PATENT DOCUMENTS

| | | | | |
|---|---|---|---|---|
| 3,102,677 A * | 9/1963 | Evans et. al. | | 417/14 |
| 3,232,519 A * | 2/1966 | Long | | 417/13 |
| 4,741,978 A * | 5/1988 | Takabayashi | | 429/23 |
| 4,935,685 A * | 6/1990 | Justus et al. | | 318/798 |
| 4,968,338 A * | 11/1990 | Sugiyama | | 62/126 |
| 5,091,686 A * | 2/1992 | Baik | | 318/798 |
| 5,589,743 A * | 12/1996 | King | | 318/139 |
| 5,624,237 A * | 4/1997 | Prescott et al. | | 417/33 |
| 5,772,403 A * | 6/1998 | Allison et al. | | 417/44.2 |
| 6,017,192 A * | 1/2000 | Clack et al. | | 417/18 |
| 6,463,949 B2 * | 10/2002 | Ferguson et al. | | 137/2 |
| 6,781,341 B2 * | 8/2004 | Nakamichi et al. | | 318/685 |
| 6,782,874 B1 * | 8/2004 | Matsumoto | | 123/520 |

(Continued)

FOREIGN PATENT DOCUMENTS
DE 102 01 893 A1 9/2002
(Continued)

OTHER PUBLICATIONS
International Search Report and Written Opinion mailed Jul. 27, 2006.
(Continued)

*Primary Examiner* — Devon C Kramer
*Assistant Examiner* — Christopher Bobish
(74) *Attorney, Agent, or Firm* — Kenyon & Kenyon LLP

(57) ABSTRACT

One form of a hydrogen operated power system according to this invention is a fuel cell system (20) provided with a supply system which supplies a gaseous fuel from a fuel supply tank (24) to a fuel cell (22), characterized in that a pump (32) is provided in the supply system, which is driven by a sensorless motor (34) having no sensor that detects at least a rotational position of the motor (34).

13 Claims, 4 Drawing Sheets

U.S. PATENT DOCUMENTS

| | | |
|---|---|---|
| 6,815,103 B2 * 11/2004 | Abe et al. | 429/13 |
| 6,908,289 B2 * 6/2005 | Scanderbeg et al. | 417/32 |
| 7,279,242 B2 * 10/2007 | Sugawara et al. | 429/17 |
| 2001/0026429 A1 * 10/2001 | Fukuda et al. | 361/93.9 |
| 2002/0094467 A1 * 7/2002 | Nonobe et al. | 429/34 |
| 2002/0146602 A1 10/2002 | Abe et al. | |
| 2002/0152039 A1 * 10/2002 | Fujimoto et al. | 702/36 |
| 2004/0159500 A1 * 8/2004 | Koura | 187/317 |

FOREIGN PATENT DOCUMENTS

| | | | |
|---|---|---|---|
| EP | 1 235 340 A2 | 8/2002 | |
| EP | 1416562 A2 | 5/2004 | |
| JP | 1159966 | 6/1989 | |
| JP | 6-223859 | 8/1994 | |
| JP | A 7-240220 | 9/1995 | |

OTHER PUBLICATIONS

German Office Action dated Oct. 31, 2006 with English translation.

* cited by examiner

HYDROGEN OPERATED POWER SYSTEM

This is a 371 national phase application of PCT/IB2003/004799 filed 30 Oct. 2003, claiming priority to Japanese Application No. 2002-319647 filed 01 Nov. 2002, the contents of which are incorporated herein by reference.

BACKGROUND OF THE INVENTION

1. Field of the Invention

The invention relates to a hydrogen operated power system, and more particularly, to a hydrogen operated power system that uses a supply system to supply a gaseous fuel from a fuel supply tank to a hydrogen operated power system.

2. Description of the Related Art

As one kind of hydrogen operated power system, technology has been proposed which, in a fuel cell system, both circulates hydrogen supplied from a fuel supply system to a fuel cell via a hydrogen circulation path, and circulates oxygen supplied from an oxidizing agent supply system to the fuel cell via an oxidizing agent circulation path (JP-A-7-240220). This system aims to improve the utilization ratio of hydrogen and oxygen supplied from the fuel supply system and the oxidizing agent supply system by circulating the hydrogen and oxygen that was not consumed in the fuel cell using the circulation paths.

This kind of a hydrogen operated power system uses a circulation pump driven by a motor to circulate the hydrogen and oxygen. A rotational position sensor, such as a resolver, is typically used in driving control of the motor to accurately detect the rotational position of the motor. However, when a rotational position sensor is used for driving control of a motor that is used with a hydrogen circulation pump, the sensor may deteriorate due to hydrogen embrittlement or the like such that it is unable to control the driving of the motor, which may interfere with the operation of the system.

SUMMARY OF THE INVENTION

One object of the hydrogen operated power system of this invention is to prevent interference with operation of the system due to sensor deterioration. Another object of the hydrogen operated power system of the invention is to determine whether there is an abnormality in the supply and circulation systems. A further object of the hydrogen operated power system of the invention is to check for an abnormality quickly at system startup.

In order to achieve at least some of the foregoing objects, the hydrogen operated power system of the invention employs the following means.

The hydrogen operated power system according to this invention uses a supply system that supplies a gaseous fuel from a fuel supply tank to a fuel cell. A characteristic of the system is that the supply system uses a pump driven by a sensorless motor which has no sensor to detect at least the rotational position of the motor.

Because the pump is driven by the sensorless motor in the hydrogen operated power system according to the invention, is possible to prevent system operation interference due to sensor deterioration from hydrogen embrittlement.

In the hydrogen operated power system of the invention, the supply system supplies a gaseous fuel to the fuel cell from the fuel supply tank by circulating it via a circulation path. The pump may also be a pump that circulates the gaseous fuel in the circulation path.

Further, the hydrogen operated power system of the invention may also be provided with abnormality detecting means for detecting a plurality of types of different abnormalities related to driving of the motor, and abnormality determining means for determining that an abnormality has occurred in the supply system when an abnormality, regardless of type, has been detected a predetermined number of times by the abnormality detecting means after an instruction has been given to start the system until a predetermined period of time has passed. Accordingly, it is possible to quickly detect an abnormality in the supply system based on an abnormality related to the driving of the motor during system startup. The reason the hydrogen operated power system detects the abnormality a predetermined number of times before making a determination that an abnormality has occurred is in order to determine whether the abnormality is in the motor or in the supply system, as well as to minimize erroneous determinations. Accordingly, the predetermined number of times may be any number as long as it is at least two.

In the hydrogen operated power system of the invention, which may determine an abnormality in the supply system based on an abnormality related to the driving of the motor, the supply system may also be provided with a check valve on a discharge side of the pump, and the abnormality determining means may determine sticking of the check valve to be an abnormality in the supply system. This kind of hydrogen operated power system of the invention may also be provided with outside air temperature detecting means for detecting the temperature of the outside air, and the abnormality determining means may be means for determining whether the check valve is stuck based on the outside air temperature detected by the outside air temperature detecting means. Further, the hydrogen operated power system may be provided with pressure detecting means for detecting a pressure on the discharge side of the pump, and the abnormality determining means may determine whether the check valve is stuck based on the pressure detected by the pressure detecting means. By determining an abnormality based on the outside air temperature and the pressure in these ways, it is possible to detect whether the check valve is stuck with even greater accuracy.

Further, the hydrogen operated power system of the invention, which may determine an abnormality in the supply system based on an abnormality related to the driving of the motor, may also be provided with system stopping means for stopping the system when it has been determined by the abnormality determining means that there is an abnormality in the check valve. Accordingly, it is possible to stop the system early on based on a quickly detected abnormality in the supply system.

Further, the hydrogen operated power system of the invention, which may determine an abnormality in the supply system based on an abnormality related to the driving of the motor, may also be provided with restart instructing means for instructing the system to restart when an abnormality has been detected by the abnormality detecting means, until it is determined by the abnormality determining means that there is an abnormality in the supply system. Accordingly, it is possible to minimize cases in which the system is stopped due to an erroneous determination.

The hydrogen operated power system of the invention may also be provided with abnormality detecting means for detecting a plurality of types of different abnormalities related to the driving of the motor, and system stopping means for stopping the system when an abnormality, regardless of type, has been detected a predetermined number of times by the abnormality detecting means within a predetermined period of time. Accordingly, it is possible to stop the system quickly when an abnormality occurs. The reason the hydrogen operated power system detects the abnormality a predetermined number of times before making a determination that an abnormality has occurred is to minimize cases in which the system is stopped due to an erroneous detection. Accordingly, the predetermined number of times may be any number as long as it is at least two. The hydrogen operated power system of the invention may also be provided with restart instructing means for instructing the system to restart when an abnormality has been detected by the abnormality detecting means, until the system is stopped by the system stopping means. Accordingly, cases in which the system is stopped due to an erroneous determination can be minimized.

In the hydrogen operated power system of the invention, which may determine an abnormality in the supply system based on an abnormality related to the driving of the motor or which may stop the system based on an abnormality related to the driving of the motor, the abnormality detecting means may also detect, as one of a plurality of abnormalities, at least one of an overcurrent abnormality in the motor, a short-circuit current abnormality in an element in the motor, and a lock abnormality in the motor.

DETAILED DESCRIPTION OF THE PREFERRED EMBODIMENTS

Figure 1:
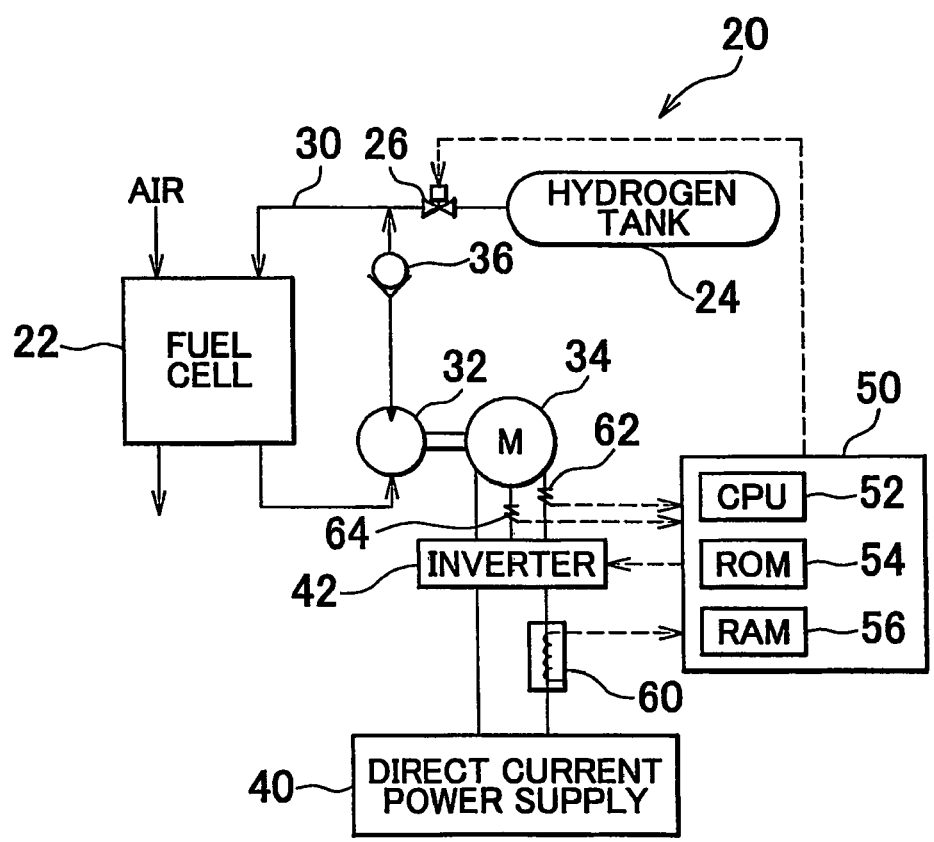
FIG. 1 is a block diagram schematically showing the configuration of a fuel cell system 20 according to one exemplary embodiment of the invention.

Next, exemplary embodiments of the invention will be described. FIG. 1 is a block diagram schematically showing the configuration of a fuel cell system 20 according to one exemplary embodiment of the invention. As shown in the drawing, the fuel cell system 20 in this exemplary embodiment is provided with a fuel cell 22 which generates electricity by an electrochemical reaction between hydrogen circulating in a circulation path 30 and oxygen in air which is supplied. The fuel cell system 20 is also provided with a hydrogen tank which supplies the hydrogen to the circulation path 30 and an electronic control unit (hereinafter simply referred to as, "ECU") 50 which controls the entire system. In addition, the fuel cell system 20 is provided with other devices such as a blower which supplies the air to the fuel cell 22, a humidifier which humidifies the air and hydrogen, a cooling system which cools the fuel cell 22, and a DC/DC converter which converts the power generated by the fuel cell 22 into a desired voltage. As these devices are not at the center of the invention, however, detailed descriptions and drawings thereof will be omitted.

In the circulation path 30 is provided a pump 32 which pressurizes unreacted hydrogen discharged from the fuel cell 22, and a check valve 36 on the discharge side of the pump 32, which prevents back-flow of the pressurized hydrogen. The pump 32 is driven by a sensorless motor 34, which has no sensor, such as a resolver, for detecting the rotational position of the motor. Direct current power from a direct current power supply 40 is converted to three-phase alternating current power by an inverter 42 and supplied to the motor 34. The reason for the motor 34 being sensorless is to prevent the driving control of the motor 34 from failing due to sensor deterioration from hydrogen embrittlement. The direct current power supply 40 used in this exemplary embodiment uses power generated by the fuel cell 22 in which the voltage has been regulated by the DC/DC converter, or power generated by the fuel cell 22 in a system such as a secondary battery that is charged using power with the regulated current.

The ECU 50 is constructed as a microprocessor, the main component of which is a CPU 52. In addition to the CPU 52, the ECU 50 is also provided with ROM 54 in which programs are stored, RAM 56 in which data is stored temporarily, and an input/output port, not shown. Various signals are input to the ECU 50 via the input port, such as signals from an IPM sensor (intelligent Power Module sensor) 60 which is provided in a power line that supplies power from the direct current power supply 40 to the inverter 42 and which detects a short-circuit current in an element, and signals indicative of phase currents Iu and Iv from current sensors 62 and 64 provided on the u phase and v phase of a three-phase power line connecting the inverter 42 with the motor 34. Further, various signals are output from the ECU 50 via the output port, such as drive signals to the regulator valve 26, which is provided in a supply conduit that supplies hydrogen to the circulation path 30 from the hydrogen tank 24, and switching control signals to the inverter 42. The sum total of the phase currents (Iu+Iv+Iw) applied to the motor 34 is 0 so, by detecting the current Iu of the u phase and the current Iv of the v phase as the phase currents, the current Iw of the w phase is able to be obtained through calculation.

Figure 2:
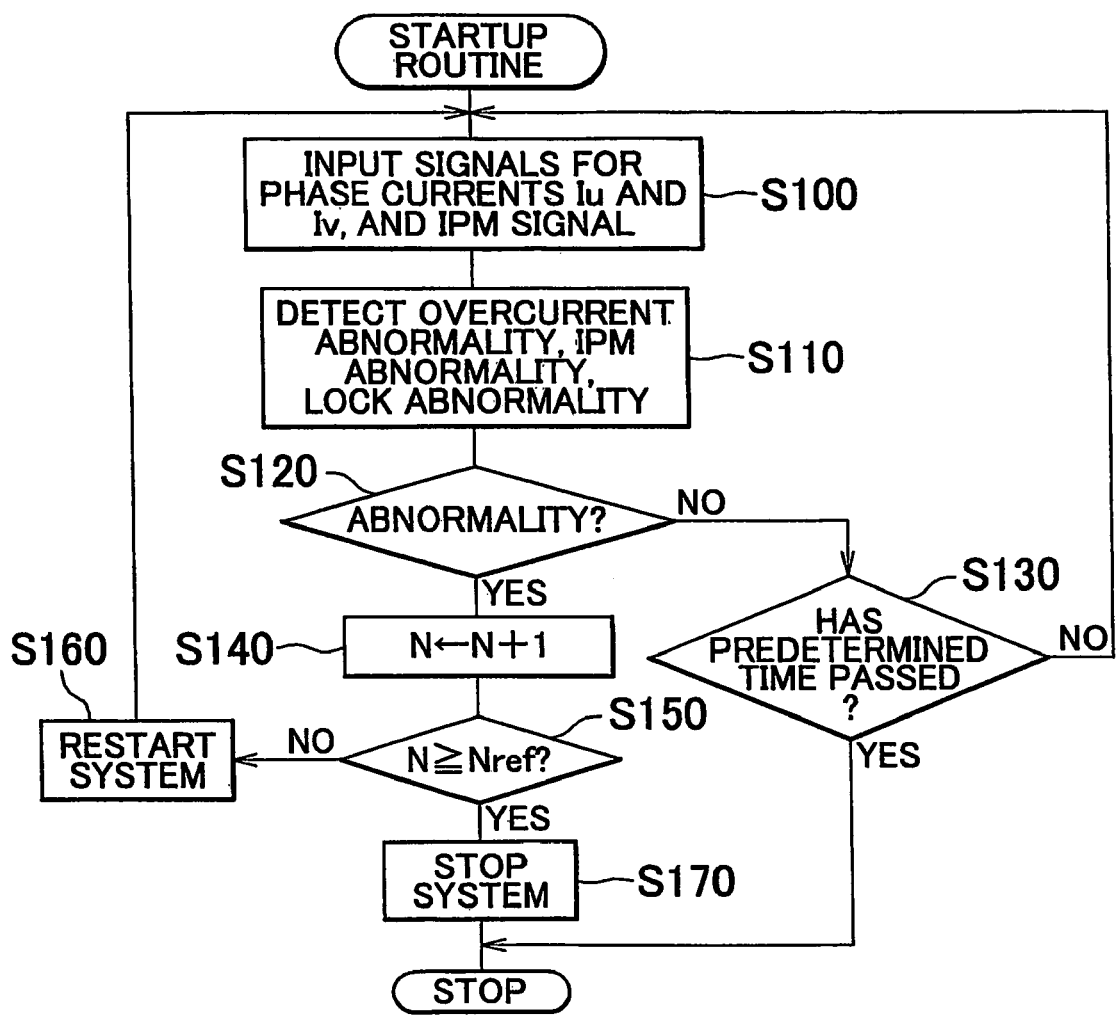
FIG. 2 is a flowchart illustrating one example of a routine executed at startup by an ECU 50 during startup.

Next, operation of the fuel cell system 20 of the above configuration, and more specifically, operation of the fuel cell system 20 detecting an abnormality in a hydrogen circulation system during startup, as well as operation of the fuel cell system 20 when an abnormality has been detected, will be described. FIG. 2 is a flowchart illustrating one example of a circulation system startup routine executed by the ECU 50 when an instruction has been given for startup. When this routine is executed, the CPU 52 of the ECU 50 first reads signals indicative of the phase currents Iu and Iv detected by the current sensors 62 and 64, as well as the signal from the IPM sensor 60 (step S100). A check is then performed to detect an overcurrent abnormality and a lock abnormality based on the read phase currents Iu and Iv, as well as a short-circuit current abnormality in an element (i.e., IPM abnormality) based on the read IPM signal (step S110). The overcurrent abnormality can be detected by a method such as determining whether an effective current applied to the motor 34 is exceeding a predetermined value above a rated value based on the phase currents Iu and Iv, and the phase current Iw calculated from those phase currents Iu and Iv. The lock abnormality can be detected from the difference between the speed of the motor 34 assumed as time passes from startup and the speed of the motor 34 estimated based on the change in the phase currents Iu and Iv. The IPM abnormality can be directly detected from the signals from the IPM sensor 60.

When it is determined, from the detection results (step S120) for the overcurrent abnormality, the lock abnormality, and the IPM abnormality, that none of those abnormalities have occurred, it is then determined whether a predetermined period of time has passed since the instruction was given for system startup (step S130). If that predetermined period of time has not passed, the process returns to step S100 and the check for the overcurrent abnormality, the lock abnormality, and the IPM abnormality is repeated. If the predetermined period of time has passed, it is determined that startup of the circulation system is complete and the routine ends. The predetermined period of time in this case is set as the time it takes to restart the system a predetermined number of times and check whether the overcurrent abnormality, the lock abnormality, or the IPM abnormality has occurred (e.g., 2 or 3 times), plus the time for the initial system startup and check (i.e., predetermined number of times+1). This predetermined number of times will be explained in greater detail later.

On the other hand, when it is determined, from the detection results (step S120) for the overcurrent abnormality, the lock abnormality, or the IPM abnormality, that any one of those abnormalities has occurred, a number of abnormality detections N is increased by a value of 1 and it is determined whether that number of abnormality detections N is equal to, or greater than, a threshold value Nref (step S150). If the number of abnormality detections N is less than the threshold value Nref, the system is restarted (step S160) and the process returns to step S100. If the number of abnormality detections N is equal to, or greater than, the threshold value Nref, the system is stopped (step S170) and the routine ends. Here, the number of abnormality detections is initially set to a value of 0 at system startup and the threshold value Nref is set to a value one greater, or one less, than the predetermined number of system restarts used when setting the predetermined period of time described above. For example, when setting the predetermined period of time to the time it takes to check three times whether the overcurrent abnormality, the lock abnormality, or the IPM abnormality has occurred (i.e., once during the initial startup and twice when the system is restarted twice), the threshold Nref is set to a value of 2 or 3. Considering the relationship between the threshold Nref and the predetermined period of time, as well as the fact that the system is restarted in step S160 when any one of the overcurrent abnormality, lock abnormality, and IPM abnormality is detected, the number of abnormality detections N becomes a value equal to, or greater than, the threshold value Nref when any one of the aforementioned abnormalities is detected each time the system is restarted from the time an instruction is given to start the system until the predetermined period of time has passed.

Now consider a case in which there is an abnormality in the circulation system in which the check valve 36 is stuck for some reason, e.g., it is frozen, such that the hydrogen is not circulated in the circulation path 30 by the pump 32 as it should be. In this case, when the motor 34 is driven when the system is started and the pump 32 attempts to circulate the unreacted hydrogen discharged from the fuel cell 22, the pressure on the discharge side of the pump 32 increases due to the fact that the check valve 36 is stuck, and a situation arises in which, by driving the motor 34, either the pump 32 is only able to rotate at a speed slower than the normally assumed speed, or is unable to rotate at all. In this case, it is randomly determined that one of the overcurrent abnormality, lock abnormality, or IPM abnormality has occurred in the motor 34. Accordingly, when it is determined that one of the overcurrent abnormality, lock abnormality, or IPM abnormality has occurred related to the driving of the motor 34 at system startup, it can be estimated that an abnormality in the hydrogen circulation system has occurred. In this exemplary embodiment, by checking for an abnormality related to the driving of the motor 34 a plurality of times as the system is restarted, erroneous determinations due to noise can be minimized, thereby increasing the accuracy of the abnormality determinations. If, within the predetermined period of time, the number of abnormality detections equals the threshold value Nref, it is determined that there is an abnormality in the hydrogen circulation system and the system is stopped. Normally, a determination that an abnormality has occurred is made based on a predetermined number of abnormality detections (e.g., 3) in order to prevent an erroneous determination due to noise or the like. When making a determination with respect to a plurality of kinds of abnormalities, the determination that an abnormality has occurred is made based on a predetermined number of abnormality detections of any one kind of abnormality. When the check valve 36 is stuck, it is randomly determined that one of the overcurrent abnormality, lock abnormality, or IPM abnormality related to the driving of the motor 34 has occurred. Therefore, when employing a determination method based on three abnormality detections for any one kind of abnormality, it would be necessary to start the system seven times if the abnormalities appeared with equal frequency, and time is also required for the abnormality check at system startup. On the other hand, in this exemplary embodiment, because the system is stopped when an abnormality in the hydrogen circulation system has been determined to have occurred due to three abnormality detections, regardless of whether the same abnormality was detected all three times, the system only needs to be restarted twice. That is, according to the exemplary embodiment, it is possible to shorten the time required to check for an abnormality during startup.

Because the motor 34 which drives the pump 32 for the hydrogen circulation system in the fuel cell system 20 according to the exemplary embodiment described above is sensorless, it is possible to prevent the driving control of the motor 34 from failing due to sensor deterioration from hydrogen embrittlement. As a result, stability and durability of the system is able to be improved.

Further, with the fuel cell system 20 according to this exemplary embodiment, the system is stopped when an abnormality in the hydrogen circulation system is determined to have occurred due to the number of abnormality detections made, after being restarted a predetermined number of times when any one of the abnormalities is detected during the check performed at system startup for an abnormality related to the driving of the motor 34, such as the overcurrent abnormality, lock abnormality, or IPM abnormality. Accordingly, because it is possible to complete the abnormality check at startup quickly, the fuel cell system 20 is well-suited for use in a vehicle.

Figure 3:
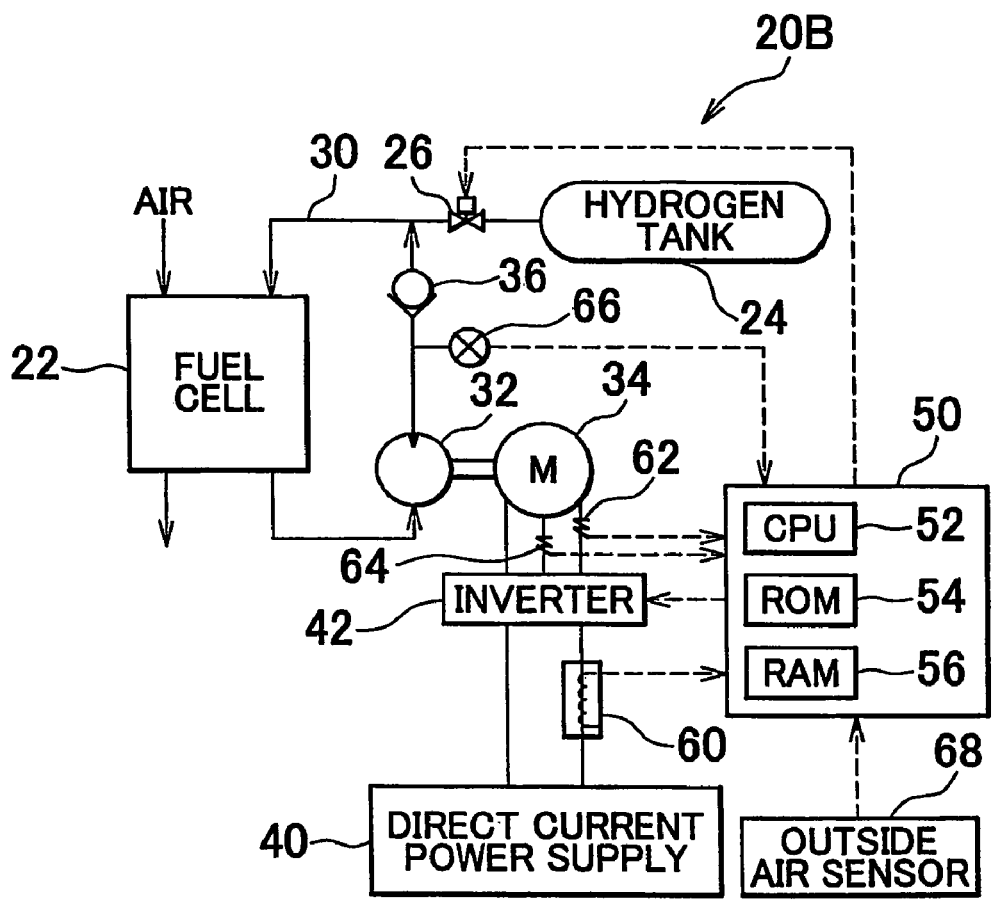
FIG. 3 is a block diagram schematically showing the configuration of a fuel cell system 20B, which is a modified example of the fuel cell system 20.
Figure 4:
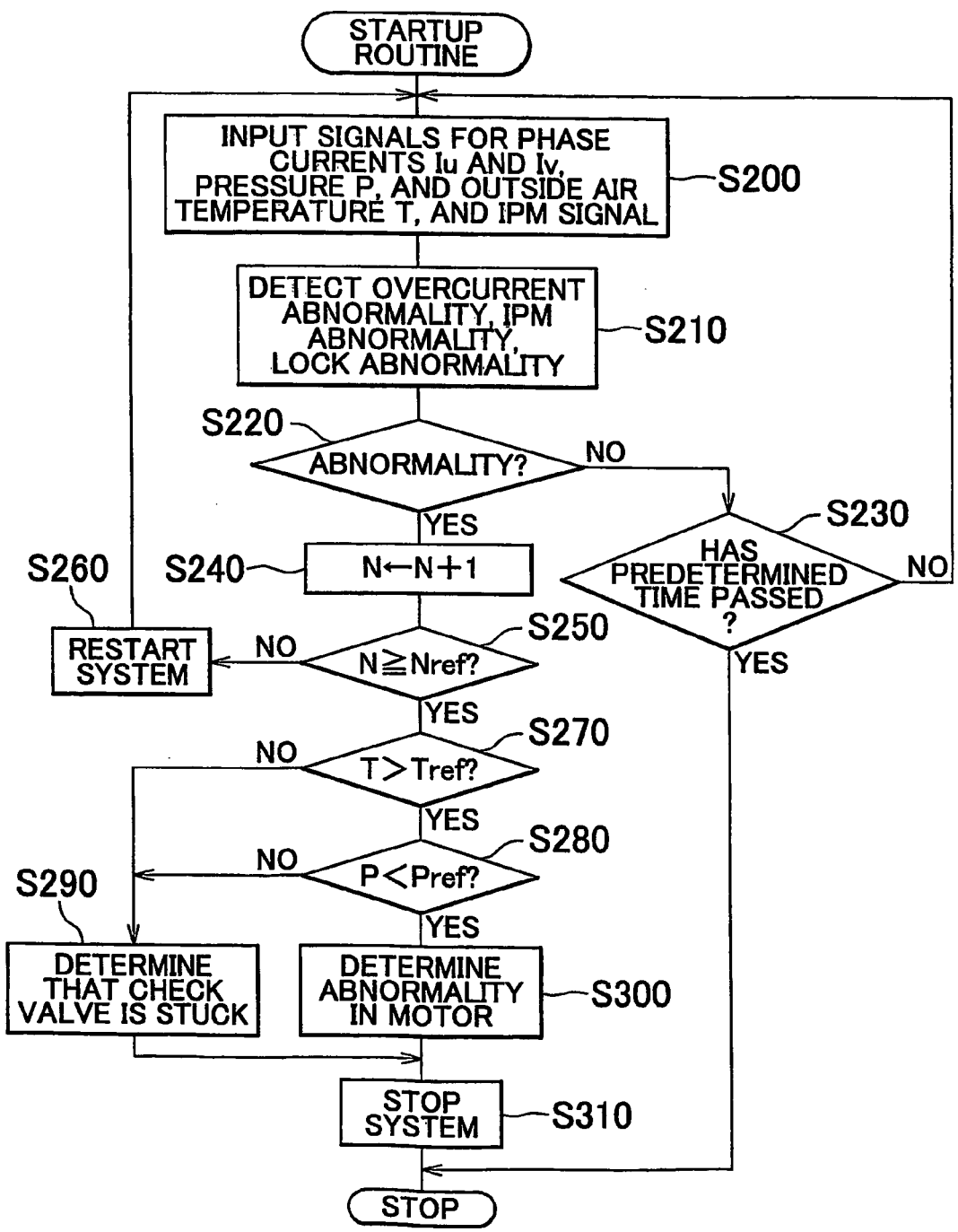
FIG. 4 is a flowchart showing one example of a modified example of the routine executed during startup.

With the fuel cell system 20 according to this exemplary embodiment, a check is performed for an abnormality related to the driving of the motor 34, such as the overcurrent abnormality, lock abnormality, or IPM abnormality. If an abnormality is detected, the system is restarted. If the system is restarted a predetermined number of times, it is determined that an abnormality has occurred in the hydrogen circulation system. Alternatively, however, when a predetermined number abnormality detections are made and all of those detections are for the same abnormality, an abnormality may be determined to have occurred that is related to driving of the motor 34, and when a predetermined number abnormality detections are made which are not all for the same abnormality, an abnormality may be determined to have occurred in the hydrogen circulation system. Further, as illustrated in a fuel cell system 20B shown in FIG. 3, which is a modified example of the fuel cell system fuel cell system 20, a pressure gauge 66 may be provided in the circulation path 30 on the discharge side of the pump 32, and it may be determined whether there is an abnormality related to the driving of the motor 34 or an abnormality in the hydrogen circulation system based on a pressure P detected by the pressure gauge 66 when an abnormality has been detected a predetermined number of times. In this case, if the pressure P when an abnormality has been detected the predetermined number of times is less than a threshold value Pref, which is set to a value larger than a pressure assumed when there is no abnormality in the hydrogen circulation system, it may be determined that there is an abnormality related to the driving of the motor 34, and if the pressure P is equal to, or greater than, the threshold value Pref, it may be determined that there is an abnormality in the hydrogen circulation system due to sticking of the check valve 36. Also, as is shown in the modified fuel cell system 20B shown in FIG. 3, an outside air temperature sensor 68 may be provided in the system and it may be determined whether there is an abnormality related to the driving of the motor 34 or an abnormality in the hydrogen circulation system based on an outside air temperature T detected by the outside air temperature sensor 68 when an abnormality has been detected a predetermined number of times. In this case, if the outside air temperature T when an abnormality has been detected the predetermined number of times is equal to, or less than, a predetermined temperature Tref, which is set to a temperature lower than a temperature at which it is assumed that the check valve 36 would freeze, it may be determined that there is an abnormality in the hydrogen circulation system due to sticking of the check valve 36 from freezing, and if the outside air temperature T is higher than the predetermined temperature Tref, it may be determined that there is either an abnormality in the hydrogen circulation system that is caused by something other than freezing, or an abnormality related to the driving of the motor 34. When making an abnormality determination in consideration of the pressure P on the discharge side of the pump 32 in the circulation path 30 or the outside air temperature T, the startup routine shown in FIG. 4 may be executed instead of the startup routine shown in FIG. 2. In the startup routine shown in FIG. 4, when the number of abnormality detections N is equal to, or greater than, the threshold value Nref and the outside air temperature T is equal to, or less than, the predetermined temperature Tref (step S270), or the outside air temperature T is higher than the predetermined temperature Tref but the pressure P on the discharge side of the pump 32 in the circulation path 30 is equal to, or greater than, the threshold Pref (step S280), it is determined that there is an abnormality in the hydrogen circulation system due to sticking of the check valve 36 (step S290) and the system is stopped (step S310). When the outside air temperature T is higher than the predetermined temperature Tref and the pressure P on the discharge side of the pump 32 in the circulation path 30 is less than the threshold valve Pref, it is determined that there is an abnormality related to the driving of the motor (step S300) and the system is stopped (step S310). Accordingly, it is possible to determine whether an abnormality is an abnormality in the hydrogen circulation system or an abnormality related to the driving of the motor 34, which facilitates appropriate response to the abnormality.

The fuel cell system 20 according to the exemplary embodiment determines the overcurrent abnormality, lock abnormality, and IPM abnormality as an abnormality related to the driving of the motor 34. The fuel cell system 20 may also determine other abnormalities as long as they are related to the driving of the motor 34 and occur due to an abnormality in the hydrogen circulation system. The fuel cell system 20 may also be such that it checks for only one or two types of abnormalities from among the overcurrent abnormality, lock abnormality, and IPM abnormality.

The fuel cell system 20 according to the exemplary embodiment is applied to an abnormality in the hydrogen circulation system. Alternatively, a system provided with an oxygen circulation system that circulates pure oxygen as an oxidizing agent to the fuel cell 22 can also be applied to an oxygen circulation abnormality. Also, the fuel cell system 20 according to the exemplary embodiment is applied to an abnormality in the hydrogen circulation system, but it may also be applied to an abnormality in a hydrogen supply system.

In the above-described exemplary embodiment, the hydrogen operated power system according to the invention is applied to a fuel cell system, but as long as the hydrogen operated power source of the invention generates power using hydrogen, it is not limited to the fuel cell system, but may be, for example, a hydrogen engine.

Although the invention has been described herein with reference to specific embodiments, many modifications and variations therein will readily occur to those skilled in the art. Accordingly, all such variations and modifications are included within the intended scope of the invention.

What is claimed is:
1. A hydrogen operated power system, comprising:
a supply system which supplies a gaseous fuel from a fuel supply tank to a hydrogen operated power source;
a pump provided in the supply system, which is driven by a sensorless motor;
an abnormality detecting portion which detects a plurality of types of different abnormalities related to currents driving the motor using a plurality of sensors at a plurality of different locations, the plurality of types of different abnormalities including abnormality in a power line supplying a power to an inverter of the motor and over-current in circuits after the current flows into the inverter; and
an abnormality determining portion which counts up an inclusive number of the plurality of types of different abnormalities, regardless of type, compares the number of the detected plurality of types of different abnormalities with a predetermined number, and determines that an abnormality has occurred in the supply system when the counted up inclusive number of the plurality of types of different abnormalities reaches the predetermined number after an instruction has been given to start the motor until a predetermined period of time has passed, the predetermined number being larger than one.

2. The hydrogen operated power system according to claim 1, wherein the supply system circulates the gaseous fuel supplied from the fuel supply tank to the hydrogen operated power source via a circulation path so as to supply the gaseous fuel to the hydrogen operated power source, and the pump circulates the gaseous fuel in the circulation path.

3. The hydrogen operated power system according to claim 1, wherein the supply system is provided with a check valve mounted on a discharge side of the pump, and the abnormality determining portion determines sticking of the check valve to be an abnormality in the supply system.

4. The hydrogen operated power system according to claim 3, further comprising an outside air temperature detecting portion which detects an outside air temperature, and the abnormality determining portion determines whether the check valve is stuck based on the outside air temperature detected by the outside air temperature detecting portion.

5. The hydrogen operated power system according to claim 3, further comprising a pressure detecting portion which detects a pressure on the discharge side of the pump, and the abnormality determining portion determines whether the check valve is stuck based on the pressure detected by the pressure detecting portion.

6. The hydrogen operated power system according to claim 1, further comprising a system stopping portion which stops the system when it has been determined by the abnormality determining portion that there is an abnormality in a check valve.

7. The hydrogen operated power system according to claim 1, further comprising a restart instructing portion which instructs the system to restart when a potential abnormality has been detected by the abnormality detecting portion, until it is determined by the abnormality determining portion that there is an actual abnormality in the supply system.

8. The hydrogen operated power system according to claim 1, further comprising:
   a system stopping portion which stops the system when the abnormality determining portion determines that the abnormality has occurred in the supply system.

9. The hydrogen operated power system according to claim 8, further comprising a restart instructing portion which instructs the system to restart when an abnormality has been detected by the abnormality detecting portion, until the system is stopped by the system stopping portion.

10. The hydrogen operated power system according to claim 1, wherein the abnormality detecting portion detects, as one of the plurality of abnormalities, at least one of an over-current abnormality in the motor, a short-circuit current abnormality in an element in the motor, and a lock abnormality in the motor.

11. The hydrogen operated power system according to claim 1, wherein the hydrogen operated power source is a fuel cell.

12. The hydrogen operated power system according to claim 1, wherein the hydrogen operated power system is a hydrogen engine.

13. The hydrogen operated power system according to claim 10, wherein the over-current abnormality in the motor is detected by two phase current sensors attached to two of three phases of the inverter, the short-circuit current abnormality in an element in the motor is detected by a sensor provided in a power line supplying direct current power to the inverter, and the lock abnormality in the motor is detected based on a difference between an assumed speed of the motor and an estimated speed according to change in the two detected phase currents.

* * * * *